United States Patent
Teru et al.

(10) Patent No.: US 6,331,281 B1
(45) Date of Patent: Dec. 18, 2001

(54) PROCESS AND APPARATUS FOR CLEANING EXHAUST GAS

(75) Inventors: Suehachi Teru; Yasusada Miyano; Noboru Akita; Kenji Otsuka; Takashi Shimada, all of Kanagawa-ken (JP)

(73) Assignee: Japan Pionics Co., Ltd., Tokyo (JP)

( * ) Notice: Subject to any disclaimer, the term of this patent is extended or adjusted under 35 U.S.C. 154(b) by 0 days.

(21) Appl. No.: 09/414,348

(22) Filed: Oct. 7, 1999

(30) Foreign Application Priority Data

Dec. 14, 1998 (JP) .................................................. 10-355044

(51) Int. Cl.$^7$ .............................. B01D 53/58; B01D 53/54
(52) U.S. Cl. ........................ 423/237; 422/171; 422/173; 422/177; 423/239.1
(58) Field of Search .................................. 423/237, 239.1, 423/239.2, 351, 658.2; 422/168, 169, 171, 173, 177

(56) References Cited

U.S. PATENT DOCUMENTS

| | | | |
|---|---|---|---|
| 4,391,790 | * 7/1983 | Palm et al. | 423/574 R |
| 5,589,146 | * 12/1996 | Mori et al. | 423/237 |
| 5,632,964 | 5/1997 | Ishii et al. | 423/210 |
| 5,660,799 | * 8/1997 | Motai et al. | 422/112 |
| 5,897,687 | * 4/1999 | Shimada et al. | 95/128 |

FOREIGN PATENT DOCUMENTS 0 604 198  6/1994 (EP) .
50026797A * 3/1975 (JP) .

* cited by examiner

Primary Examiner—Steven P. Griffin
Assistant Examiner—Maribel Medina
(74) Attorney, Agent, or Firm—Oblon, Spivak, McClelland, Maier & Neustadt, P.C.

(57) ABSTRACT

There are disclosed a process for cleaning ammonia-containing exhaust gas which comprises bringing the exhaust gas into contact with an ammonia decomposition catalyst (e.g. nickel, ruthenium) under heating to decompose most of the ammonia into nitrogen and hydrogen, subsequently bringing the resultant mixed gas into contact with an ammonia adsorbent (e.g. synthetic zeolite) for adsorbing undecomposed ammonia, and then heating regenerating the adsorbent, while bringing reproduced exhaust gas containing the ammonia desorbed from the adsorbent into contact under heating, with the ammonia decomposition catalyst or another ammonia decomposition catalyst; and an apparatus for carrying out the process. It is made possible by the process and apparatus to efficiently and completely clean ammonia-containing exhaust gas exhausted from a semiconductor manufacturing process and the like without generating useless byproduct and dispensing with secondary treatment.

14 Claims, 5 Drawing Sheets

PROCESS AND APPARATUS FOR CLEANING EXHAUST GAS

BACKGROUND OF THE INVENTION

1. Field of the Invention

The present invention relates to a process and an apparatus or cleaning ammonia-containing exhaust gas. More particularly, the present invention pertains to a process and an apparatus for cleaning ammonia-containing exhaust gas which is exhausted from a semiconductor manufacturing process or a chemical treatment process.

2. Description of the Related Arts

Ammonia has widely been used in recent years in each of manufacturing processes with continuous development of a semiconductor manufacturing industry, an optoelectronics industry, a precision machinery and instrument manufacturing industry, a cemented carbide material industry, an ornament manufacturing industry and the like. Among the foregoing industries, a large amount of ammonia is used in the manufacturing process of a nitride film of a compound semiconductor.

Although ammonia is an indispensable substance in the manufacturing process of a compound semiconductory, it is highly toxic, and thus has a threshold limit value in time weighted average (TLV–TWA) of 25 ppm. Therefore, in the case where an ammonia-containing exhaust gas is exhausted in the atmosphere, it exerts evil influence upon human bodies and environment. Accordingly, it is necessary to clean, prior to exhaust in the atmosphere, an ammonia-containing exhaust gas which is exhausted after ammonia is used in a semiconductor manufacturing process or the like.

In addition, a large amount of ammonia is used in some chemical industries. In this case, an ammonia-containing exhaust gas is exhausted as the case may be, and needs to be cleaned prior to exhaust into the atmosphere.

There have heretofore been known as a process for cleaning ammonia-containing exhaust gas, ① a process in which an ammonia-containing exhaust gas is brought into contact with an acidic aqueous solution of sulfuric acid or the like so as to clean the gas by capturing the ammonia contained therein as a salt such as ammonium sulfate; ② a process in which an ammonia-containing exhaust gas is introduced in a combustion furnace so as to clean the gas by converting the ammonia into water and nitrogen; ③ a process in which an ammonia-containing exhaust gas is brought into contact with a dry system ammonia harm-removing agent to clean the gas; ④ a process in which an ammonia-containing exhaust gas is brought into contact with an ammonia decomposition catalyst under heating so as to clean the gas by converting the ammonia into nitrogen and hydrogen ; ⑤ a process for cleaning an ammonia-containing exhaust gas by the combination of the ammonia decomposition catalyst and the dry system ammonia harm-removing agent; and the like process.

However, the above-mentioned processes involves such problems as described hereunder.

The cleaning process ① of bringing into contact with an acidic aqueous solution of sulfuric acid or the like suffers from the defect of by-producing a large amount of an ammonium salt at the time of cleaning treatment. The cleaning process ② by combustion in a combustion furnace suffers from not only the disadvantage that the process is possibly accompanied with incomplete combustion, abnormal combustion or the danger of explosion because of the variations in the gas flow rate, combustible components and the like, since the exhaust gas is not exhausted under stationary state in many cases, but also the drawback that harmful nitrogen oxides are generated by the combustion treatment. The cleaning process ③ by bringing the gas into contact with a dry system ammonia harm-removing agent suffers from the shortcomings that in the case of treating a large amount of ammonia contained in the gas, a large amount of the harm-removing agent is needed, whereby a great expense is incurred and further, a large sized treatment unit is required in cleaning treatment. The cleaning process ④ by bringing the gas into contact with an ammonia decomposition catalyst under heating suffers from the disadvantage that a part of ammonia remains undecomposed in a concentration of several tens to several hundreds ppm in the cleaned exhaust gas, since the ammonia decomposition ratio is specified by the chemical equilibrium among the reactants. In addition, the cleaning process ⑤ by the combination of the decomposition catalyst and the harm-removing agent suffers from the drawback that a large amount of the harm-removing agent is needed owing to a high ammonia concentration of several tens to several hundreds ppm in the treated exhaust gas.

Under such circumstances, it has been eagerly desired to develop and provide an efficient process and a compact apparatus which exhibit high cleaning performance, facilitate the treatment after the cleaning, minimize ammonia effluence in the exhaust gas after cleaning and are capable of treating an ammonia-containing gas at a low cost.

SUMMARY OF THE INVENTION

Under such circumstances, intensive extensive research and investigation were accumulated by the present inventors in order to solve the above-mentioned problems involved in the prior arts. As a result, it has been found that ammonia-containing gas can be almost completely cleaned by a process which comprises the steps of bringing an ammonia-containing exhaust gas into contact with an ammonia decomposition catalyst under heating to decompose the ammonia into nitrogen and hydrogen, thereafter bringing undecomposed ammonia remaining in the gas after the ammonia decomposition treatment into contact with an adsorbent to separate ammonia through adsorption, and subsequently again bringing the exhaust gas used for heating regenerating the adsorbent into contact with said ammonia decomposition catalyst. It has been found that the treated gas can be exhausted under the condition of a minimized concentration of ammonia by bringing said exhaust gas used for heating regenerating the adsorbent into contact with another ammonia decomposition catalyst (a second ammonia decomposition catalyst) which has otherwise been provided. The present invention has been accomplished by the foregoing findings and information.

Specifically, the present invention relates to a process for cleaning ammonia-containing exhaust gas which comprises the steps of bringing an ammonia-containing exhaust gas into contact with at least one train of an ammonia decomposition catalyst under heating to decompose the ammonia into nitrogen and hydrogen, thereafter bringing the resultant mixed gas into contact with at least one train of an ammonia adsorbent which is installed adsorb undecomposed ammonia remaining in the exhaust gas so as to clean the exhaust gas, and subsequently heating the adsorbent to regenerate the same, while bringing reproduced exhaust gas containing the ammonia desorbed from the adsorbent into contact under heating, with either said ammonia decomposition catalyst or another ammonia decomposition catalyst so as to clean the exhaust gas containing the desorbed ammonia. The present invention also pertains to an apparatus for cleaning ammonia-containing exhaust gas which comprises an ammonia decomposition column packed inside with an ammonia decomposition catalyst and equipped with a heater; an ammonia adsorption column packed inside with an ammonia adsorbent and equipped with a heater in the subsequent stage; and such a constitution that reproduced exhaust gas generated at the time of heating regenerating the adsorbent is fed to either said ammonia decomposition catalyst or another ammonia decomposition catalyst installed separately therefrom.

A first embodiment of the present invention relates to a process for cleaning ammonia-containing exhaust gas which comprises the steps of bringing an ammonia-containing exhaust gas into contact with at least one train of an ammonia decomposition catalyst under heating to decompose the ammonia into nitrogen and hydrogen, thereafter bringing the resultant mixed gas into contact with either of at least two trains of an ammonia adsorbent by switching one after one, said adsorbent being installed to adsorb undecomposed ammonia remaining in the exhaust gas so as to clean the exhaust gas, and then heating the adsorbent by switching one after one to regenerate the same, while bringing reproduced exhaust gas containing the ammonia desorbed from the adsorbent into contact under heating with said ammonia decomposition catalyst so as to clean the exhaust gas containing the desorbed ammonia.

A second embodiment of the present invention pertains to a process for cleaning ammonia-containing exhaust gas which comprises the steps of bringing an ammonia-containing exhaust gas into contact with at least one train of an ammonia decomposition catalyst under heating to decompose the ammonia into nitrogen and hydrogen, thereafter bringing the resultant mixed gas into contact with either of at least two trains of an ammonia adsorbent by switching one alter one, said adsorbent being installed to adsorb undecomposed ammonia remaining in the exhaust gas so as to clean the exhaust gas, and subsequently heating the adsorbent by switching one after one to regenerate the same, while bringing reproduced exhaust gas containing the ammonia desorbed from the adsorbent into contact under heating with another ammonia decomposition catalyst so as to clean the exhaust gas containing the desorbed ammonia.

A third embodiment of the present invention is concerned with a process for cleaning ammonia-containing exhaust gas which comprises the steps of bringing an ammonia-containing exhaust gas into contact with at least one train of an ammonia decomposition catalyst under heating to decompose the ammonia into nitrogen and hydrogen, then bringing the resultant mixed gas into contact with one train of an ammonia adsorbent which is installed to adsorb undecomposed ammonia remaining in the exhaust gas so as to clean the exhaust gas, and then heating the adsorbent to regenerate it, while bringing reproduced exhaust gas containing the ammonia desorbed from the adsorb into contact under heating with said ammonia decomposition catalyst or another ammonia decomposition catalyst so as to clean the exhaust gas containing the desorbed ammonia.

A fourth embodiment of the present invention pertains to a process for cleaning ammonia-containing exhaust gas which comprises the steps of feeding an ammonia-containing exhaust gas to either of at least two trains that are each composed of an ammonia decomposition catalyst and an ammonia adsorbent and are juxtaposed in parallel in an alternately switchable manner, bringing said ammonia-containing exhaust gas into contact with the catalyst in said train to decompose ammonia into nitrogen and hydrogen, and bringing the resultant mixed gas into contact with the adsorbent in said train to separate undecomposed ammonia remaining in the exhaust gas by adsorption so as to clean the exhaust gas, while heating the adsorbent in the other train when necessary to regenerate the same, and bringing reproduced exhaust gas containing the ammonia desorbed from said adsorbent into contact under heating with the ammonia decomposition catalyst in said other train so as to clean the exhaust gas containing the desorbed ammonia.

A fifth embodiment of the present invention is concerned also with an apparatus for cleaning ammonia-containing exhaust gas which comprises an ammonia decomposition column packed inside with an ammonia decomposition catalyst and equipped with a heater, at least two trains of ammonia adsorption columns in the subsequent stage which are juxtaposed in parallel in an alternately switchable manner, are each packed inside with an ammonia adsorbent and are each equipped with a heater, and an installation for feeding reproduced exhaust gas generated at the time of heating regenerating said adsorbent to said ammonia decomposition column.

A sixth embodiment of the present invention relates also to an apparatus for cleaning ammonia-containing exhaust gas which comprises an ammonia decomposition column packed inside with an ammonia decomposition catalyst and equipped with a heater, at least two trains of ammonia adsorption columns in the subsequent stage which are juxtaposed in parallel in an alternately switchable manner, are each packed inside with an ammonia adsorbent and are each equipped with a heater, and an installation for Feeding reproduced exhaust gas generated at the time of heating regenerating said adsorbent to an ammonia decomposition column which is installed separately from said ammonia decomposition column, is packed inside with an ammonia decomposition catalyst, and is equipped with a heater.

A seventh embodiment of the present invention pertains also to an apparatus for cleaning ammonia-containing exhaust gas which comprises an ammonia decomposition column packed inside with an ammonia decomposition catalyst and equipped with a heater, one train of ammonia adsorption column in the subsequent stage which is packed inside with an ammonia adsorbent and is equipped with a heater, and an installation for feeding reproduced exhaust gas generated at the time of heating regenerating said adsorbent to an ammonia decomposition column which is installed separately from said ammonia decomposition column, is packed inside with an ammonia decomposition catalyst, and is equipped with a heater.

A eighth embodiment of the present invention pertains further to an apparatus for cleaning ammonia-containing exhaust gas which comprises at least two trains that are juxtaposed in parallel in an alternately switchable manner and are each composed of an ammonia decomposition column which is packed inside with an ammonia decomposition catalyst and is equipped with a heater, and an ammonia adsorbent column which is packed inside with an ammonia adsorbent and is equipped with a heater, and such a constitution that part of outlet gas from the ammonia adsorbent column in either train can be switchably fed to the adsorbent in the other train as the gas for regenerating the same time, and reproduced exhaust gas from the adsorbent in said other train is cleaned through the ammonia decomposition column in said other train.

DESIGNATION OF SYMBOLS

1: exhaust gas feed line
2, 2': heat exchanger
3, 3': ammonia decomposition column
4, 4', 21 ammonia decomposition catalyst
5, 5', 10, 10', 22: heater
6, 6', 16, 19, 31: piping
7', 11, 11', 13, 14, 14', 25, 26, 28, 30, 32, 38, 38', 40, 40': valve
8, 8': ammonia adsorption column
9, 9': ammonia adsorbent
12, 23, 29, 34, 41: exhaust gas purge line
15: blower
17, 17', 18, 18', 27, 33, 39, 39': cooler
20: second ammonia decomposition column
24: inert gas feed line

DESCRIPTION OF THE PREFERRED EMBODIMENTS

The present invention is applied to the cleaning of an ammonia-containing gas which is exhausted from a chemical treatment process as well as from a semiconductor manufacturing process.

The present invention is concerned with a process for cleaning an ammonia-containing gas by bringing an ammonia-containing gas into contact with an ammonia decomposition catalyst so that the ammonia contained in the aforesaid gas is decomposed into nitrogen and hydrogen, then causing an ammonia adsorbent to capture undecomposed ammonia contained in the treated gas, exhausting the gas from which undecomposed ammonia has been removed, regenerating the used adsorbent through heating, and again bringing reproduced exhaust gas containing ammonia which is desorbed from the adsorbent at the time of heating regeneration into contact with the ammonia decomposition catalyst, followed by the exhaust of the gas thus treated, or circulating said reproduced exhaust gas through the system comprising the ammonia decomposition catalyst and the ammonia adsorbent in combination, followed by the exhaust of the gas thus treated.

The ammonia decomposition catalyst to be used in the present invention is not specifically limited insofar as the catalyst is capable of gas-phase decomposition of ammonia into hydrogen and nitrogen. Examples of usable catalyst in this case include well known conventional ammonia decomposition catalyst such as a catalyst comprising a metal exemplified by nickel, iron, palladium, platinum and ruthenium or a compound of any of the metals, said metal or compound thereof being supported on an inorganic carrier; a catalyst which comprises any of the above-mentioned metal or compound thereof as an effective ingredient, and is prepared by tableting molding or extrusion molding; and a catalyst which comprises a plurality of catalytic species in addition to any of the above-mentioned metal or compound thereof. Of these, ruthenium catalyst is preferable because of high ammonia decomposition activity obtainable thereby even at a low temperature.

Any of the above-exemplified catalyst can be prepared by a method in which a metallic salt solution is impregnated into or stuck to a carrier such as alumina, a method in which a powdery metal compound is tableted along with a lubricant, or a method in which a slurry containing a metal compound is extrusion molded. However, the catalyst is available from the marketed ammonia decomposition catalysts.

The shape of the ammonia decomposition catalyst is not specifically limited, but is usually exemplified by the form of ring, tablet, column, sphere, and the like. The ammonia decomposition catalyst is usually packed in a metallic column (hereinafter referred to as "ammonia decomposition column), and is used in the form of a fixed bed. When the ammonia decomposition catalyst is used by being packed in the ammonia decomposition column, the packing length thereof is usually in the range of 50 to 3000 mm, approx. in more detail, however, the length is determined in accordance with the concentration of ammonia contained in the ammonia-containing gas, flow rate of the gas to be treated, reaction temperature, shape of the catalyst and the like.

The condition under which the ammonia is decomposed in the present invention is not limited by the concentration of ammonia contained in the ammonia-containing gas. Even if the concentration reaches almost 100%, the ammonia can be catalytically decomposed as it is without any pretreatment. The reaction temperature at the time of decomposing ammonia is usually in the range of 450 to 1200° C., preferably 600 to 900° C. Preferability in the ammonia decomposition increases with decreasing operation pressure, thus enabling ammonia decomposition at a reduced pressure. However, the operation pressure is usually in the range of 0.01 to 1 MPa, preferably 0.09 to 0.5 MPa from the viewpoint of operability.

The superficial linear velocity (LV) of the ammonia-containing exhaust gas in the ammonia decomposition column is determined in accordance with the concentration of ammonia contained in the ammonia-containing gas, packing length of the ammonia decomposition catalyst, reaction temperature and the like, and is usually in the range of 0.1 to 200 cm/sec, preferably 1 to 50 cm/sec expressed in terms of LV at 0° C. and atmospheric pressure.

By decomposing ammonia contained in the exhaust gas under the aforesaid conditions, the concentration of ammonia is lowered usually to 60 to 1000 ppm at the outlet of the ammonia decomposition column.

The portion wherein the ammonia decomposition catalyst is packed in the ammonia decomposition column is maintained at a desired reaction temperature with a heater placed on said column. Prior to the feed of the exhaust gas to the ammonia decomposition column, it is possible to preheat said gas by a method in which the exhaust gas is heated to the reaction temperature, approx. with a heater, a method in which the exhaust gas is subjected to heat exchange with the exhaust gas coming out from the ammonia decomposition column, and the like methods.

Examples of the ammonia adsorbents that are usable in the present invention include natural zeolite, synthetic zeolite, activated carbon, alumina, silica gel and silica alumina. Of these, synthetic zeolite, activated carbon and the like are preferable because of stable and intensive adsorption capacity obtainable thereby. There is preferably used synthetic zeolite having a micropore diameter of 4 Å or 5 Å, approx. (molecular sieve 4A, 5A produced by Union Showa Co. Ltd. or Linde Corp.).

The ammonia adsorbent is usually used in a state of being packed in a metallic column (hereinafter referred to as "ammonia adsorption column). Prior to actual use, the ammonia adsorbent is activated and thereafter is used to adsorb and separate undecomposed ammonia through physical adsorption by bringing the exhaust gas coming from the ammonia decomposition column into contact with the ammonia adsorbent.

In the present invention, the operation pressure of the exhaust gas from the ammonia decomposition column at the time of being brought into contact with the ammonia adsorbent, is not specifically limited, but can be set on atmospheric pressure, reduced pressure or elevated pressure. In addition, the superficial linear velocity (LV) of the exhaust from the ammonia decomposition column at the time of being brought into contact with the ammonia adsorbent, is usually in the range of 1 to 30 cm/sec, preferably 5 to 15 cm/sec.

The temperature of the exhaust gas from the ammonia decomposition column at the time of being brought into contact with the ammonia adsorbent, is in the range of usually 100° C. or lower, preferably 70° C. or lower, more preferably around ordinary temperature (0 to 50° C.)

The adsorbent which has been used for separating ammonia through adsorption is reactivated (hereinafter referred to as "heating regeneration of adsorbent") by passing therethrough, a dry gas free from ammonia under heating. The temperature at the time of heating regeneration of adsorbent varies depending upon an adsorbent itself, and can not be unequivocally determined, but is set on a temperature higher than the temperature at the time of adsorption, usually in the range of 100 to 350° C.

The heating regeneration of adsorbent can be put into practice by passing therethrough under heating, part of the purge gas which is generated by cleaning the ammonia-containing exhaust gas (hereinafter referred to as "self-gas") or an inert gas such as nitrogen.

In the following, the the present invention will be specifically described with reference to FIG. 5, which is a schematic illustration showing an example of exhaust gas cleaning apparatus according to the present invention.

The ammonia-containing exhaust gas is ted to the ammonia decomposition column 3 through the exhaust gas feed line 1 and the heat exchanger 2. In the ammonia decomposition column 3, which is packed inside with the ammonia decomposition catalyst 4, and is heated with a heater 5, most of the ammonia that is contained in the ammonia-containing exhaust gas is decomposed into nitrogen and hydrogen. The outlet gas from the ammonia decomposition column 3 is introduced in the ammonia adsorption column 8 which is kept at around ordinary temperature through the heat exchanger 2, the cooler 17, the piping 6 and the valve 7.

The ammonia adsorption column 8 is packed inside with the activated adsorbent 9 such as synthetic zeolite, onto which the undecomposed ammonia in the outlet gas from the ammonia decomposition column 3 is adsorbed so that it is separated from said gas, and the exhaust gas thus cleaned is exhausted in the atmosphere through the valve 11 and the exhaust gas purge line 12.

At the time of said gas exhaust, part of the outlet gas from the ammonia adsorption column 8 is introduced through the valve 13, in the ammonia adsorption column 8' being heated, where the adsorbent 9' onto which ammonia is adsorbed is regenerated by heating. The reproduced exhaust gas which is exhausted from the ammonia adsorption column 8' and which contains a large amount of ammonia is introduced in the ammonia decomposition column 3 through the cooler 18', the valve 14', the blower 15, the piping 16 and the exhaust gas feed line 1.

In addition, when the heating regeneration is completed, the heating of the ammonia adsorption column 8' with the heater 10' is interrupted, and said column is allowed to cool to around ordinary temperature to prepare for the changeover with the ammonia adsorption column 8.

At the point of time when the adsorption capacity of the adsorbent in the ammonia adsorption column 8 reaches the saturated adsorption amount, or the effluence of ammonia is recognized in the outlet gas, or said effluence is drawing near, the gas passageway is switched from the valve 7 to the valve 7', and from the valve 11 to the valve 11' so as to switch the passageway of the outlet gas from the ammonia adsorption column 8 to the side of the ammonia adsorption column 8'.

Moreover, heating regeneration of the ammonia adsorption column 8 is carried out in the same manner as that of the column 8' so as to prepare for the changeover thereto.

By the above-mentioned procedure it is made possible to completely clean ammonia contained in the ammonia-containing exhaust gas without exhausting ammonia in the atmosphere at all.

The concentration of the undecomposed ammonia in the outlet gas from the ammonia decomposition column varies depending upon the catalytic decomposing conditions, but it is usually in the range of 60 to 1000 ppm, thus enabling the undecomposed ammonia to be easily separated by adsorption in the ammonia adsorption column 8 or 8'.

According to the above-described systematic procedure, it is made possible to exhaust the purge gas which is completely free from ammonia after the cleaning of the exhaust gas, whereby the ammonia-containing exhaust gas can be perfectly cleaned, dispensing with auxiliary material or resources except for electric power for heat source or driving power source without generating any byproduct requiring secondary treatment.

Figure 4:
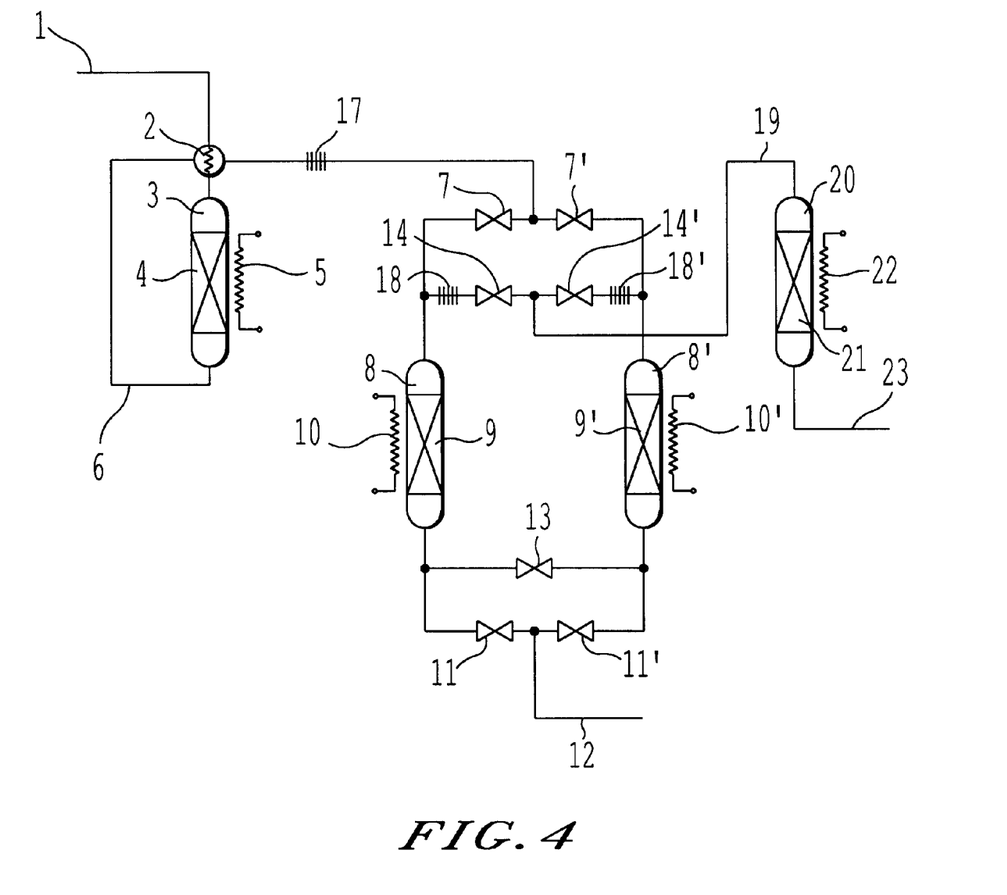
FIG. 4 is a schematic illustration showing an example of exhaust gas cleaning apparatus (reproduced exhaust gas is cleaned through a second ammonia decomposition column and then is exhausted as it is) according to the present invention.

It is possible in the present invention as illustrated in FIG. 4 to decompose ammonia contained in the ammonia-containing exhaust gas into nitrogen and hydrogen by introducing the reproduced exhaust gas containing ammonia which is desorbed from the adsorbent at the time of heating regeneration into another ammonia decomposition column which is installed separately from said ammonia decomposition columns 20 (hereinafter referred to as "second ammonia decomposition column").

The outlet gas from the second ammonia decomposition column can be exhausted into the atmosphere as such after being diluted, since the concentration of the undecomposed ammonia in said outlet gas is in the range of 60 to 1000 ppm, approx., which is markedly decreased as compared with the concentration thereof in the initial ammonia-containing exhaust gas which is the object of cleaning. In this case, however, there is inevitably exhausted into the atmosphere, undecomposed ammonia in an amount based on the decomposition efficiency in the second ammonia decomposition column.

Figure 2:
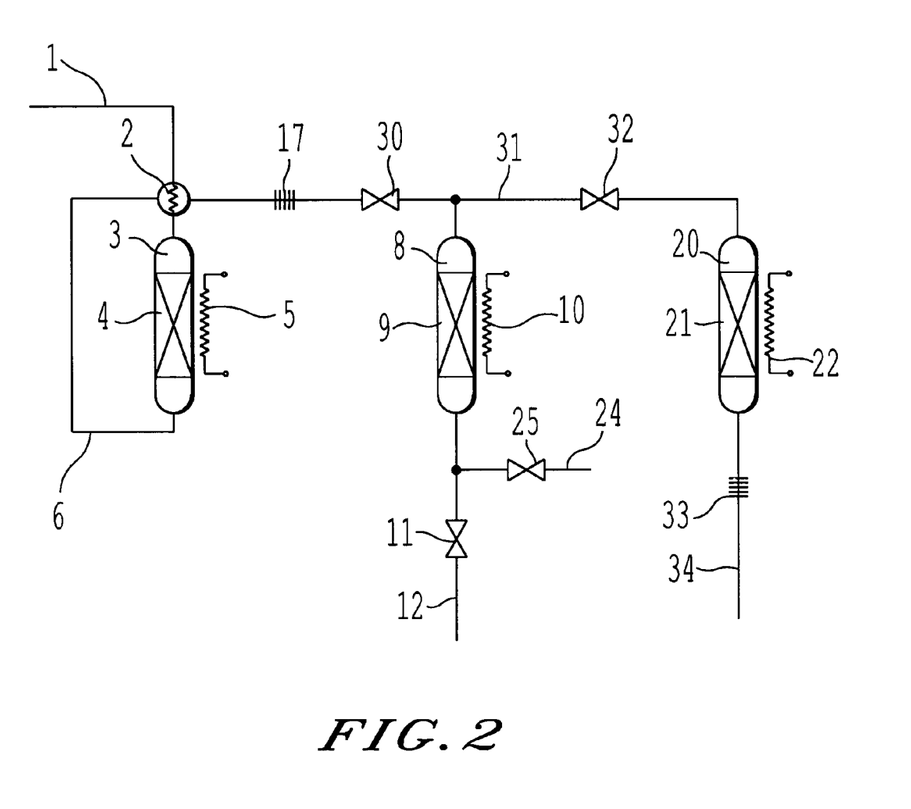
FIG. 2 is a schematic illustration showing an example of exhaust gas cleaning apparatus (reproduced exhaust gas is cleaned through a second ammonia decomposition column and then is exhausted as it is) according to the present invention.
Figure 3:
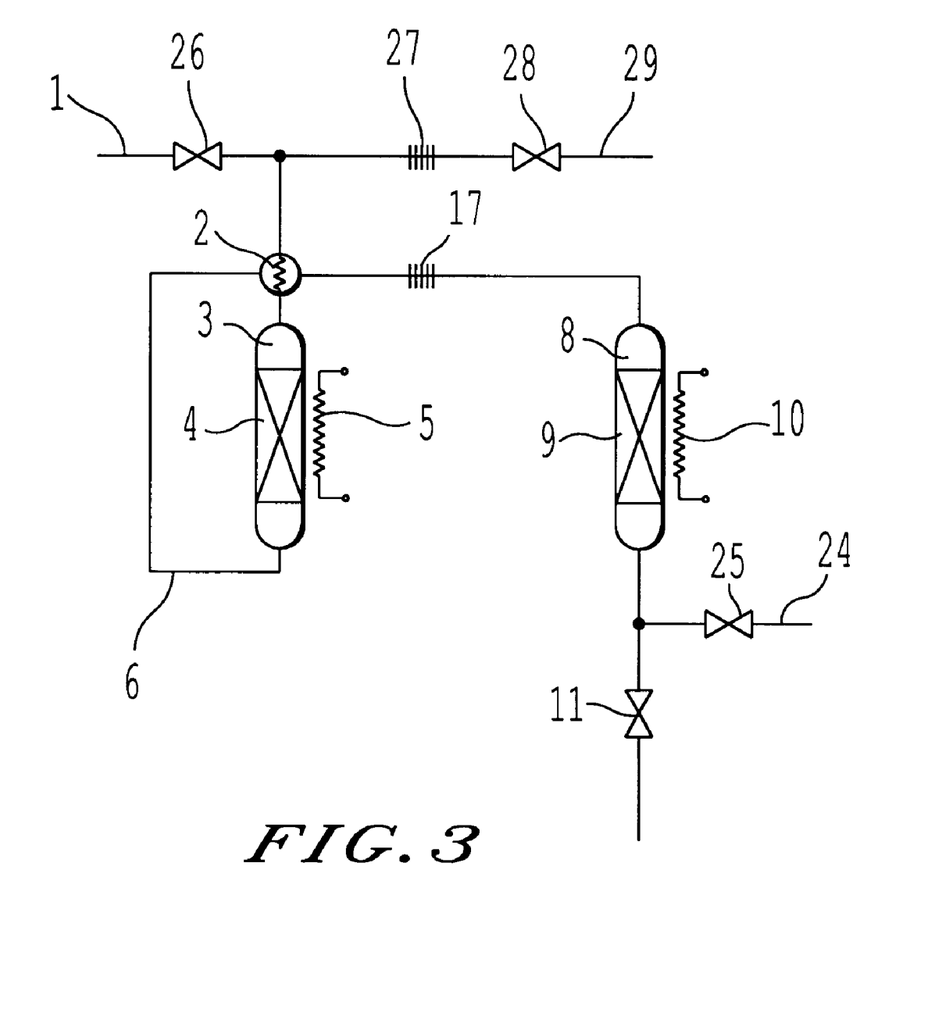
FIG. 3 is a schematic illustration showing an example of exhaust gas cleaning apparatus (reproduced exhaust gas is cleaned through a ammonia decomposition column and then is exhausted as it is) according to the present invention.

It is possible in the present invention as illustrated in FIG. 3 to clean the ammonia-containing exhaust gas by the combination of an ammonia decomposition column and an ammonia adsorption column. Likewise, it is possible in the present invention as illustrated in FIG. 2 to clean the ammonia-containing exhaust gas by the combination of an ammonia decomposition column, an ammonia adsorption column and a second ammonia decomposition column. In any of the above-mentioned cases, however, the cleaning operation of the exhaust gas is inevitably made intermittent, since the operation of adsorbing the outlet gas from the ammonia decomposition column is impossible during the heating regeneration of the ammonia adsorption column.

Figure 1:
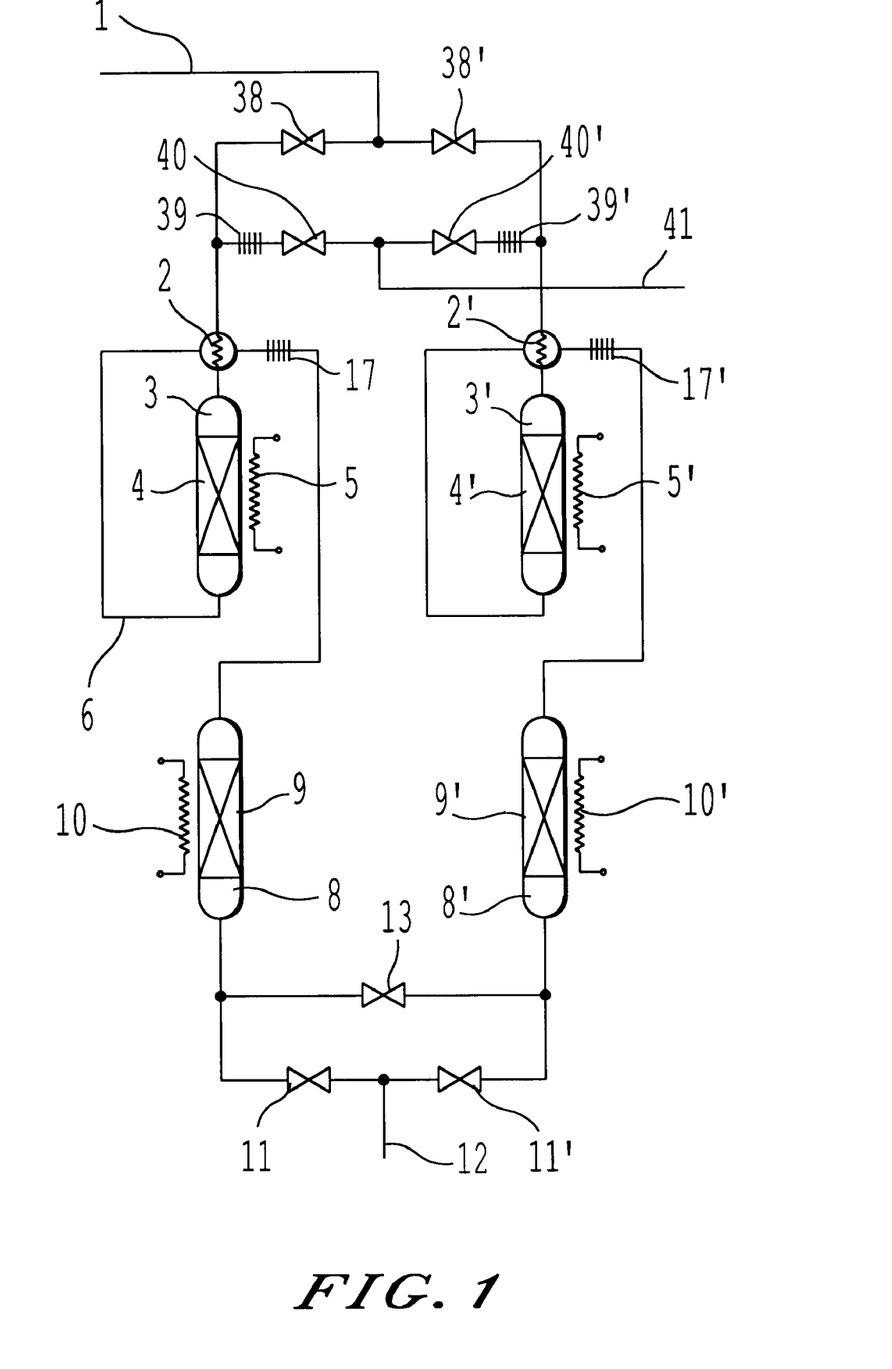
FIG. 1 is a schematic illustration showing an example of exhaust gas cleaning apparatus (reproduced exhaust gas is circulated through an ammonia decomposition column) according to the present invention.

Further, it is possible in the present invention as illustrated in FIG. 1 to clean the ammonia-containing exhaust gas by installing two trains in parallel each composed of an ammonia decomposition column and an ammonia adsorption column, constituting the adsorption system so that it is possible to feed part of the outlet gas from the ammonia adsorption column of either train as the adsorbent-regenerating gas for the other train, and making changeover operation alternately.

Even if the cleaning system is, as is the case with FIG. 1, composed of two trains in parallel each comprising an ammonia decomposition column and an ammonia adsorption column so as to enable alternate changeover, said system is included in and belongs to the combination of an ammonia decomposition column and an ammonia adsorption column according to the present invention, if it is so constituted that an inert gas is supplied from outside as a regenerating gas for each of the ammonia adsorption columns.

The present invention further enables to clean, as the post-stage treatment, the outlet gas from the second ammonia decomposition column by the use of a dry type ammonia cleaning agent, or through wet absorption by means of aqueous solution of an acid, or by introducing the gas in a combustion furnace. In the case where the cleaning system according to the present invention is incorporated with any of the aforesaid post-stage treatment, it requires auxiliary materials and resources such as dry type ammonia cleaning agent, aqueous solution of an acid, fuel or the like according to the treatment system. In spite of such requirement, the purge gas can be exhausted in a state free from ammonia, thereby enabling an almost complete cleaning of the ammonia-containing exhaust gas.

In the case where the reproduced exhaust gas from the adsorbent is introduced in the ammonia decomposition column to clean the gas, followed by exhausting the same as such as illustrated in FIGS. 3 and 1, the exhaust gas can be treated in the same manner as the above-mentioned post-stage treatment of the outlet gas from the second ammonia decomposition column.

It is still further possible at the time of the heating regeneration for the adsorbent according to the present invention to feed the reproduced exhaust gas containing desorbed ammonia in a train comprising the combination of the second ammonia decomposition column and an ammonia adsorption column which is installed separately from the aforesaid ammonia adsorption column (hereinafter referred to as "second ammonia adsorption column") so as to clean said exhaust gas therein. However, said cleaning system is nothing more than one modification of the present invention in the basic sense, thus falling within the scope of the present invention.

The apparatus for cleaning the exhaust gas as illustrated in FIGS. 1 to 5) according to the present invention comprises an ammonia decomposition column for decomposing ammonia into nitrogen and hydrogen, an ammonia adsorption column for adsorbing and separating the undecomposed ammonia contained in the gas after the decomposing treatment, and piping, or an apparatus or apparatuses for feeding reproduced exhaust gas containing ammonia desorbed from an adsorbent at the time of heating regeneration thereof, in the ammonia decomposition column.

It is preferable to use, as the material of construction for the ammonia decomposition column, a metal which is not only capable of enduring the reaction temperature conditions, but also is least liable to hydrogen embrittlement or nitriding due to nitrogen or hydrogen formed by the decomposition of ammonia contained in the exhaust gas, and which is exemplified by nickel chromium alloys, Incoloy 800 and Inconel 600 that are available from INCO Corporation.

Well known heating methods are employed for heating the ammonia decomposition column, and are exemplified by a method in which a heater is fitted to the outside of the ammonia decomposition column, a method in which a heater is embedded in the packing portion of the ammonia decomposition catalyst and a method in which a preheater is installed on the upstream side of the ammonia decomposition column in addition to any of the above-mentioned means. It is also possible to adopt such a constitution that heat exchange is effected between inlet gas into the ammonia decomposition column and outlet gas therefrom in order to enhance the thermal efficiency.

There is employed, as the material of construction for the ammonia adsorption column, a corrosion resistant material such as SUS 304, SUS 316 and SUS 316L. In addition, there is also adopted a method in which a heater is fitted to the outside of the ammonia adsorption column or a method in which a heater is embedded inside the column.

It is possible in the present invention to clean the ammonia-containing exhaust gas by only one ammonia adsorption column, but it is preferable to adopt such a constitution that at least two ammonia adsorption columns are juxtaposed in parallel so that the adsorption of undecomposed ammonia and the heating regeneration of the adsorbent are carried out alternately in each of the columns, thus enabling continuous cleaning of the ammonia-containing exhaust gas. The cleaning apparatus is further equipped with piping, coolers, valves and the like for feeding an inert gas or self-gas to be used for the heating regeneration of the adsorbent.

Such being the case, the ammonia adsorption column can be equipped with the constitution same as that of a well known gas purifying apparatus for adsorbing and removing impurities such as a general purpose gas including oxygen and nitrogen.

It is possible in the present invention to install a break through detection means in the latter half portion of the ammonia adsorption column so as to enable changeover to the other adsorption column prior to the break through of one adsorption column, or between the ammonia adsorption column and a standby ammonia adsorption column to be installed on the post-stage thereof. Examples of the break through detection means include sampling piping for analysis gas and ammonia detector.

The exhaust gas cleaning apparatus according to the present invention is equipped with pumps, blowers, piping for supplying an inert gas and the like as equipment for the purpose of feeding reproduced exhaust gas containing ammonia desorbed from the adsorbent to the ammonia decomposition column so as to clean said gas through circulation at the time of performing heating regeneration of the adsorbent. The type of each equipment is not specifically limited. By constituting the exhaust gas cleaning apparatus in the foregoing manner, it is made possible to clean the ammonia-containing exhaust gas continuously, efficiently and completely.

According to the present invention, in the case where the reproduced exhaust gas containing ammonia is introduced in a separately installed second ammonia decomposition column, then the ammonia contained therein is decomposed into nitrogen and hydrogen, and thereafter the outlet gas from said column is exhausted as such in the atmosphere, the cleaning system is so constituted that the exhaust gas can be mixed with a large amount of an inert gas or air.

In the case where the outlet gas from the second ammonia decomposition column is cleaned by the use of a dry type ammonia cleaning agent, aqueous solution of an acid or a combustion furnace, it is possible to employ corresponding well known equipment, respectively, and the cleaning system therefor is not specifically limited.

It is possible at the time of the heating regeneration for the adsorbent according to the present invention to feed the reproduced exhaust gas containing desorbed ammonia into a train comprising the combination of the second ammonia decomposition column and the second ammonia adsorption column so as to clean said exhaust gas therein through circulation. However, said cleaning system is nothing more than the combination of the ammonia decomposition column and one or a plurality of ammonia adsorption columns in the basic sense, thus falling within the scope of the present invention.

By virtue of the process and apparatus for cleaning the exhaust gas, it is possible to clean the ammonia-containing exhaust gas in an extremely high efficiency irrespective of the concentration of ammonia contained in the exhaust gas. In particular, in the case where the reproduced exhaust gas from the ammonia adsorption column is introduced in the ammonia decomposition column to carry out circulative treatment, it is made possible to exhaust the purge gas after the cleaning treatment in a state free from ammonia. That is to say, the ammonia-containing exhaust gas can be cleaned continuously and almost completely without the use of any auxiliary material or resource.

Moreover in the case where the reproduced exhaust gas from the ammonia adsorption column is introduced in the second ammonia decomposition column, it is made possible to exhaust the purge gas containing ammonia in a markedly decreased concentration as compared with the original ammonia-containing exhaust gas as the object of primary treatment. Furthermore in the case where the the outlet gas from the second ammonia decomposition column is subjected to combinational treatment with a post-stage treatment by the use of a dry type ammonia cleaning agent, aqueous solution of an acid or a combustion furnace, it is made possible to clean the same almost completely.

In the following, the present invention will be described more specifically with reference to comparative examples and working examples, which however shall not limit the the present invention thereto.

EXAMPLE 1

<Fabrication of Exhaust Gas Cleaning Apparatus>

There was fabricated as an ammonia decomposition column, a tubular reactor which was made of Incoloy 800 and had an inside diameter of 83 mm and a length of 1000 mm. The tubular reactor thus fabricated was packed inside with a nickel-based columnar ammonia decomposition catalyst which had a diameter of 5 mm and a length of 5 mm in a packing length of 500 mm, and was composed of 18 parts by weight of nickel supported on 100 parts by weight of alumina as the carrier. The reactor was equipped outside with an electrical heater so as to enable heating from outside, whereby the ammonia decomposition column was completed.

Subsequently, there were fabricated two SUS 316 made ammonia adsorption columns each having an inside diameter of 108.3 mm and a length of 1350 mm. The adsorption columns thus fabricated were each packed inside, as an ammonia adsorbent, with a columnar synthetic zeolite (molecular sieve 5A, produced by Union Showa Co., Ltd.) which had a diameter of 1.6 mm and a length of 5 mm in a packing length of 1200 mm. The adsorption columns were each equipped outside with an electrical heater so as to enable heating from outside, whereby the ammonia adsorption columns were completed.

Figure 5:
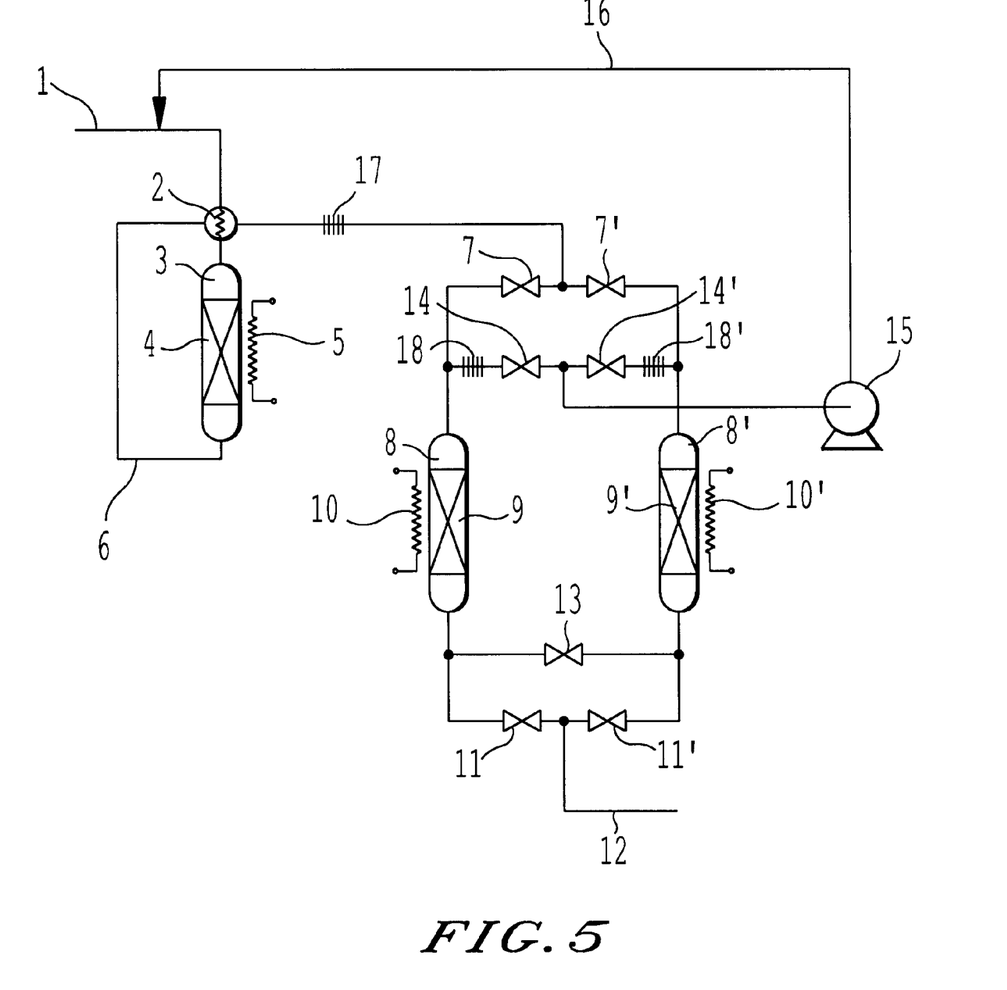
FIG. 5 is a schematic illustration showing an example of exhaust gas cleaning apparatus (reproduced exhaust gas is cleaned through a ammonia decomposition column and then is exhausted as it is) according to the present invention.

Thus an exhaust gas cleaning apparatus as illustrated in FIG. 5 was fabricated by the use of the ammonia decomposition column and ammonia adsorption columns as mentioned above and a heat exchanger, a cooler and a blower.

<Preparation of Exhaust Gas Cleaning Apparatus>

The atmosphere in the cleaning apparatus was replaced with nitrogen, and then the ammonia decomposition column was heated to 800° C. Subsequently the cleaning apparatus was charged with an exhaust gas consisting of 20 vol % of ammonia, 5 vol % of hydrogen and 75 vol % of nitrogen at a flow rate of 50 Nl/min under atmospheric pressure from the exhaust gas feed line 1 as shown in FIG. 5-Exhaust gas cleaning apparatus.

The outlet gas from the ammonia decomposition column was exhausted from the exhaust gas purge line via the ammonia adsorption column 8, while part of the outlet gas from the ammonia adsorption column 8 (5 Nl/min) was fed via the valve 13 to the ammonia adsorption column 8' which had been heated to 300° C. over a period of 10 hours to proceed with the regeneration of the adsorbent in the ammonia adsorption column 8'. Thereafter, the adsorption column 8' the heating of which was discontinued, and was allowed to cool to around ordinary temperature so as to prepare for the next changeover, while the reproduced exhaust gas from the adsorption column 8' was introduced in the exhaust gas feed line 1 via the cooler 18', valve 14', blower 15 and piping 16.

The outlet gas from the ammonia decomposition column 3 was fed to the ammonia adsorption column 8 for 100 hours, and then the feeding was switched to the ammonia adsorption column 8' and continued for 100 hours, while the regeneration of the adsorbent in the ammonia adsorption column 8 was carried out in the same manner as the foregoing to proceed with the preparation of exhaust gas cleaning apparatus. The adsorption operations in the ammonia adsorption columns 8, 8' were each performed at ordinary temperature.

<Cleaning Experiment for Exhaust Gas>

The feeding of the outlet gas from the ammonia decomposition column was switched to the ammonia adsorption column 8 which was kept at ordinary temperature to start cleaning experiment for exhaust gas, while part of the outlet gas from the ammonia adsorption column 8 (5 Nl/min) was fed to the ammonia adsorption column 8' over a period of 10 hours to proceed with the regeneration of the adsorbent in the ammonia adsorption column 8'.

During the cleaning of the exhaust gas, part of the outlet gas from the ammonia decomposition column 3 and part of the outlet gas from the ammonia adsorption column 8 were each sampled at a definite interval of time to measure the concentration of ammonia contained therein.

As a result, ammonia was not detected in the outlet gas from the ammonia adsorption column 8 during a period of 198 hours from the start of the feeding of the ammonia-containing exhaust gas, but at the point of time when 199 hours elapsed from the start thereof, the concentration of ammonia in the outlet gas from the ammonia adsorption column 8 exceeded the TLV-TMA. The results are given in Table 1. In this connection, the measurement of ammonia concentration in said exhaust gas was performed by means of gas chromatography with a heat conductivity type detector and a gas detector (produced by Gas Tec Co.,Ltd., lower detection limit of 0.2 ppm).

TABLE 1

Lapse of Time and Ammonia Concentration in Cleaning Experiment

| Lapse of time (hour) | 5 | 50 | 100 | 150 | 199 |
|---|---|---|---|---|---|
| Conc. at decomposition column outlet (ppm) | 620 | 640 | 650 | 630 | 630 |
| Conc. at adsorption column outlet (ppm) | n.d | n.d | n.d | n.d | 30 |

[Remarks ] n.d: not detected

EXAMPLE 2

Cleaning experiment for exhaust gas was carried out by the use of the apparatus for cleaning exhaust gas and the ammonia-containing exhaust gas as used in Example 1. While ammonia adsorption was conducted in either adsorption column, heating regeneration was conducted in the other adsorption column. By alternately repeating the foregoing procedure, a measurement was made of the lapse of time from the start of the cleaning experiment to the point of time when the ammonia concentration at the outlet of the ammonia adsorption column 8, or 8' reached the upper limit of TLV-TMA (25ppm) {break through time}. The results are given in Table 2. It was confirmed from the Table that alternately repeated heating regeneration was surely conducted without deterioration of adsorption capacity in any of the ammonia adsorption column 8, or 8'.

TABLE 2

Number of Repeats and Break Through Time

| | Ammonia adsorption column 8 | Ammnonia adsorption column 8' |
|---|---|---|
| First time | 198 | 202 |
| Second time | 205 | 201 |
| Third time | 196 | 204 |
| Fourth time | 208 | 199 |
| Fifth time | 197 | 210 |

EXAMPLE 3

The procedure in Example 1 was repeated to proceed with cleaning experiment for exhaust gas except that there was used an ammonia-containing exhaust gas consisting of 5 vol % of ammonia, 5 vol % of hydrogen and 90 vol % of nitrogen, and the ammonia decomposition column was heated to 600° C. instead of 800° C., while measurements were made of ammonia concentrations and variations thereof in the outlet gas from the ammonia decomposition column 8 and the outlet gas from the ammonia adsorption column 8. The results are given in Table 3. The concentration of ammonia in the outlet gas from the ammonia adsorption column 8 was not higher than the detection limit during a period of 168 hours from the start of the feeding of the ammonia-containing exhaust gas, but at the point of time when 169 hours elapsed from the start, said concentration reached 65 ppm.

TABLE 3

Lapse of Time and Ammonia Concentration in Cleaning Experiment

| Lapse of time (hour) | 5 | 50 | 100 | 150 | 169 |
|---|---|---|---|---|---|
| Conc. at decomposition column outlet (ppm) | 780 | 760 | 770 | 780 | 780 |
| Conc. at adsorption column outlet (ppm) | n.d | n.d | n.d | n.d | 65 |

[Remarks] n.d: not detected

EXAMPLE 4

The cleaning apparatus same as in Example 1 was used to proceed with cleaning experiment for exhaust gas except that gas sampling piping for the purpose of detecting break through by ammonia was installed at the position 150 mm upside from the bottom of the adsorbent packing portion in each of the ammonia adsorption columns. Thus the experiment was started for the cleaning of the ammonia-containing exhaust gas and the heating regeneration of adsorption columns in the same manner as in Example 1. At the point of time when break through by ammonia was detected at the portion where the gas sampling piping was fitted to the adsorption column, the gas feeding was switched to the other adsorption column, thereby continuing the cleaning experiment for the exhaust gas over a period of 1500 hours.

As a result, it was confirmed that ammonia was not detected in any of the purge exhaust gas throughout the period of cleaning experiment for the exhaust gas, and therefore that the cleaning was perfectly implemented.

EXAMPLE 5

<Fabrication of Exhaust Gas Cleaning Apparatus>

The ammonia decomposition column which was fabricated in Example 1 was used as the first ammonia decomposition column. Further, as the second ammonia decomposition column, there was fabricated a tubular reactor which was made of Incoloy 800, had an inside diameter of 83 mm and a length of 600 mm, and was packed inside with the ammonia decomposition catalyst same as in Example 1 in a packing length of 350 mm. The ammonia adsorption columns in Example 1 were each used by fitting thereto, gas sampling piping for the purpose of detecting break through by ammonia at the position 150 mm upside from the bottom of the adsorbent packing portion in each ammonia adsorption column. Thus an exhaust gas cleaning apparatus as illustrated in FIG. 4 was fabricated by the use of the ammonia decomposition columns and ammonia adsorption columns as mentioned above.

<Cleaning Experiment for Exhaust Gas>

The first ammonia decomposition column and the second ammonia decomposition column were each maintained at 900° C. By using the changeover system in which the first ammonia adsorption column and the second ammonia adsorption column were alternately switched therebetween prior to break through, adsorption of ammonia and regeneration of the adsorbent were carried out at ordinary temperature and 300° C., respectively, while the cleaning apparatus was charged with an exhaust gas consisting of 20 vol % of ammonia, 5 vol % of hydrogen and 75 vol % of nitrogen at a flow rate of 50 Nl/min under atmospheric pressure over a period of 960 hours. Concurrently, at the time of regenerating the adsorbent, the self gas was passed through the adsorption column at a flow rate of 5 Nl/min for 5 hours each, the reproduced exhaust gas from the adsorption column was passed through the second ammonia decomposition column, and the outlet gas from the second ammonia decomposition column was diluted with gaseous nitrogen, followed by being exhausted in the atmosphere.

As a result, ammonia effluence in the outlet gas from the ammonia adsorption column was not recognized throughout the experiment, and the concentration of ammonia in the outlet gas from the second ammonia decomposition column was 520 ppm at the time of showing a maximum value.

EXAMPLE 6

<Fabrication of Exhaust Gas Cleaning Apparatus>

There were fabricated two ammonia decomposition columns which were each same as that in Example 1, but packed inside as the ammonia decomposition catalyst, with 0.3% by weight of metallic ruthenium supported on alumina. In addition, there were fabricated two ammonia adsorption columns which were each same as that in Example 1. Thus an exhaust gas cleaning apparatus as illustrated in FIG. 1 was fabricated by the use of the ammonia decomposition columns and ammonia adsorption columns as mentioned above with such a constitution that the cleaning apparatus consisted of two trains which were juxtaposed in parallel and each composed of one of the ammonia decomposition columns and one of the ammonia adsorption columns.

<Cleaning Experiment for Exhaust Gas>

Both the ammonia decomposition column in either train and the ammonia decomposition column in the other train were each maintained at 600° C. By using the changeover system in which the ammonia adsorption column in either train and the ammonia adsorption column in the other train were alternately switched therebetween prior to break through, adsorption of ammonia and regeneration of the adsorbent were carried out at ordinary temperature and 300° C., respectively, while the cleaning apparatus was charged with an exhaust gas consisting of 20 vol % of ammonia, 5 vol % of hydrogen and 75 vol % of nitrogen at a flow rate of 100 Nl/min under atmospheric pressure over a period of 960 hours. Concurrently, at the time of regenerating the adsorbent, the self gas was passed through the adsorption column at a flow rate of 5 Nl/min for 5 hours each, the reproduced exhaust gas from said adsorption column was passed through the ammonia decomposition column in the same train, and the outlet gas from said ammonia decomposition column was diluted with gaseous nitrogen, followed by being exhausted in the atmosphere.

As a result, ammonia effluence in the outlet gas from each of the ammonia adsorption columns was not recognized throughout the experiment, and the concentration of ammonia in the outlet gas from each of the ammonia decomposition columns was 860 ppm at the time of showing a maximum value.

Comparative Example 1

The procedure in Example 1 was repeated to carry out the cleaning experiment for ammonia-containing exhaust gas except that each of the adsorbents in the ammonia adsorption column 8 and the ammonia adsorption column 8' was removed.

As a result, it was confirmed that at least 600 ppm of undecomposed ammonia was contained in the exhaust gas purge line throughout the experimental period.

What is claimed is:

1. A process for cleaning ammonia-containing exhaust gas comprising the steps of:

bringing an exhaust gas containing ammonia into contact with at least one train of an ammonia decomposition catalyst under heating to decompose the ammonia into nitrogen and hydrogen;

bringing a resultant mixed gas from the ammonia decomposition catalyst into contact with at least one train of an ammonia adsorbent to adsorb undecomposed ammonia remaining in the exhaust gas; and bringing at least one of an inert gas and a part of a purged gas generated by cleaning the exhaust gas into contact with the ammonia adsorbent under heating to regenerate the ammonia adsorbent while bringing a reproduced exhaust gas containing ammonia desorbed from the ammonia adsorbent into contact under heating with at least one of said ammonia decomposition catalyst and another ammonia decomposition catalyst under heating so as to clean the reproduced exhaust gas containing the ammonia desorbed from the ammonia adsorbent.

2. The process for cleaning ammonia-containing exhaust gas according to claim 1, wherein the at least one train of an ammonia adsorbent comprises at least two trains of an ammonia adsorbent, the resultant mixed gas is brought into contact with at least one of the at least two trains of an ammonia adsorbent switching one by one, and the at least two trains of an ammonia adsorbent are heated alternately to regenerate the at least two trains of an ammonia adsorbent.

3. The process for cleaning ammonia-containing exhaust gas according to claim 1, wherein said at least one train of an ammonia adsorbent comprises one train of an ammonia adsorbent, the resultant mixed gas is brought into contact with the one train of an ammonia adsorbent.

4. The process for cleaning ammonia-containing exhaust gas according to claim 1, wherein:

the exhaust gas is fed to at least one of at least two trains juxtaposed in parallel in an alternately switchable manner, the two trains each including an ammonia decomposition catalyst and an ammonia adsorbent to bring said exhaust gas into contact with said at least one decomposition catalyst, decompose the ammonia into nitrogen and hydrogen, bring the resultant mixed gas into contact with said at least one ammonia adsorbent, and adsorb undecomposed ammonia remaining in the exhaust gas through adsorption;

the ammonia adsorbent in one of the two trains is heated to regenerate while the reproduced exhaust gas containing the ammonia desorbed from said ammonia adsorbent is brought into contact under heating with the ammonia decomposition catalyst in the one of the two trains so as to clean the reproduced exhaust gas containing the ammonia desorbed from said ammonia adsorbent.

5. The process for cleaning ammonia-containing exhaust gas according to claim 1, wherein the ammonia decomposition catalyst comprises at least one component selected from the group consisting of nickel, iron, palladium, platinum, ruthenium and a compound of any of nickel, iron, palladium, platinum and ruthenium.

6. The process for cleaning ammonia-containing exhaust gas according to claim 1, wherein the exhaust gas is brought into contact with the ammonia decomposition catalyst at a temperature in a range of 450 to 1200° C.

7. The process for cleaning ammonia-containing exhaust gas according to claim 1, wherein the exhaust gas is brought into contact with the ammonia adsorbent at a temperature of 100° C. at the highest.

8. An apparatus for cleaning ammonia-containing exhaust gas, comprising:

an ammonia decomposition column connected to a source of the ammonia-containing exhaust gas via an exhaust gas feed line and packed inside with an ammonia decomposition catalyst and equipped with a heater; and at least one train of an ammonia adsorption column packed inside with an ammonia adsorbent and equipped with a heater, said at least one train of an ammonia adsorption column being connected to receive a resultant mixed gas from the ammonia decomposition catalyst in said ammonia decomposition column;

wherein:

said source of the ammonia-containing exhaust gas excludes said at least one train of an ammonia adsorption column; and at least one of said ammonia decomposition catalyst and another ammonia decomposition catalyst installed separately therefrom decomposes a reproduced exhaust gas generated at the time of regenerating the ammonia adsorbent under heat.

9. The apparatus for cleaning ammonia-containing exhaust gas according to claim 8, further comprising:

a feeding device configured to feed the reproduced exhaust gas to said ammonia decomposition column;

wherein said at least one train of an ammonia adsorption column comprises at least two trains of ammonia adsorption columns juxtaposed in parallel in an alternately switchable manner, said at least two trains of ammonia adsorption columns are each packed inside with an ammonia adsorbent and are each equipped with a heater.

10. The apparatus for cleaning ammonia-containing exhaust gas according to claim 8, further comprising:

a second ammonia decomposition column installed separately from said ammonia decomposition column, said second ammonia decomposition column being packed with an ammonia decomposition catalyst inside and equipped with a heater; and a feeding device configured to feed the reproduced exhaust gas to said second ammonia decomposition column;

wherein said at least one train of an ammonia adsorption column comprises at least two trains of ammonia adsorption columns juxtaposed in parallel in an alternately switchable manner, and said at least two trains of ammonia adsorption columns are each packed inside with an ammonia adsorbent and are each equipped with a heater.

11. The apparatus for cleaning ammonia-containing exhaust gas according to claim 8, further comprising:

a second ammonia decomposition column installed separately from said ammonia decomposition column, said second ammonia decomposition column being packed with an ammonia decomposition catalyst inside and equipped with a heater; and a feeding device configured to feed the reproduced exhaust gas to said second ammonia decomposition column;

wherein said at least one train of an ammonia adsorption column comprises one train of an ammonia adsorption column packed inside with an ammonia adsorbent and equipped with a heater.

12. The apparatus for cleaning ammonia-containing exhaust gas according to claim 8, wherein:

said at least one train of an ammonia adsorption column comprises at least two trains juxtaposed in parallel in an alternately switchable manner, each including an ammonia decomposition column packed inside with an ammonia decomposition catalyst, an ammonia adsorption column packed inside with an ammonia adsorbent, and each equipped with a heater; and said two trains are configured to switchably feed part of outlet gas from the ammonia adsorption column in one of the two train to the ammonia adsorbent in other one of the two trains to regenerate the ammonia adsorbent, and to clean a reproduced exhaust gas from the ammonia adsorbent in said other one of the two trains through the ammonia decomposition column in said other one of the two trains.

13. The apparatus for cleaning ammonia-containing exhaust gas according to claim 8, wherein the at least one train of an ammonia adsorption column includes means for detecting ammonia break through installed at at least one of a latter half portion of the ammonia adsorption column and between the ammonia adsorption column and a standby ammonia adsorption column installed thereof.

14. An apparatus for cleaning ammonia-containing exhaust gas, comprising:

ammonia decomposition means for receiving the ammonia-containing exhaust gas from a source and decomposing ammonia in the ammonia-containing exhaust gas;

ammonia adsorption means for adsorbing ammonia remaining in the exhaust gas from said ammonia decomposition means; and feeding means for feeding a reproduced exhaust gas reproduced in said ammonia adsorption means to at least one of said ammonia decomposition means and another ammonia decomposition means.

\* \* \* \* \*